United States Patent [19]

Esaki et al.

[11] Patent Number: 5,238,460
[45] Date of Patent: Aug. 24, 1993

[54] POWER TRANSMISSION SYSTEM FOR VEHICLE

[75] Inventors: Seiji Esaki; Kazuhiko Ueda; Osamu Sado; Seiji Terauchi, all of Hiroshima, Japan

[73] Assignee: Mazda Motor Corporation, Hiroshima, Japan

[21] Appl. No.: 833,680

[22] Filed: Feb. 11, 1992

[30] Foreign Application Priority Data

Feb. 28, 1991 [JP] Japan .................. 3-058310
Mar. 4, 1991 [JP] Japan .................. 3-062627
Oct. 16, 1991 [JP] Japan .................. 3-267446

[51] Int. Cl.⁵ ............................ F16H 37/06
[52] U.S. Cl. .................... 475/192; 475/59; 475/195; 475/216
[58] Field of Search .......... 475/59, 65, 191, 192, 475/195, 215, 216, 217

[56] References Cited

U.S. PATENT DOCUMENTS

| | | | |
|---|---|---|---|
| 3,244,025 | 4/1966 | Francisco | 475/215 X |
| 3,406,597 | 10/1968 | De Brie Perry et al. | 475/216 X |
| 3,548,682 | 12/1970 | Schofield et al. | 475/217 X |
| 3,618,423 | 11/1971 | Chery | 475/195 X |
| 3,628,398 | 12/1971 | Chery | 475/195 X |
| 4,638,687 | 1/1987 | De Brie Perry | 475/191 |
| 4,693,134 | 9/1987 | Kraus | 475/216 |

FOREIGN PATENT DOCUMENTS 63-176862 7/1988 Japan .
2-240444 9/1990 Japan .

Primary Examiner—Richard M. Lorence
Assistant Examiner—Benjamin Levi
Attorney, Agent, or Firm—Sixbey, Friedman, Leedom & Ferguson

[57] ABSTRACT

A power transmission system for a vehicle has a first power transmission path having a forward-reverse shift mechanism and a reduction gear, a second power transmission path having an infinitely variable gear, and a path switching mechanism which switches the power transmission path between the first and second power transmission paths according to the running condition of the vehicle. The infinitely variable gear is a toroidal speed change mechanism having an output disk fixed to the output shaft of the power transmission system, an input disk which can be displaced in the axial direction of the output shaft and a roller which is in contact with both the input and output disks to rotate about an axis in response to rotation of the input disk and transmit rotation of the input disk to the output disk, the transmission ratio of the toroidal speed change mechanism being changed by changing the inclination of the axis about which the roller rotates.

16 Claims, 10 Drawing Sheets

POWER TRANSMISSION SYSTEM FOR VEHICLE

BACKGROUND OF THE INVENTION

1. Field of the Invention

This invention relates to a power transmission system for a vehicle, and more particularly to a power transmission system for a vehicle having a first power transmission path in which engine output power is transmitted to the driving wheels through a reduction gear and a second power transmission path in which engine output power is transmitted to the driving wheels through an infinitely variable gear.

2. Description of the Prior Art

As disclosed in Japanese Unexamined Patent Publication Nos. 63(1988)-176862 and 2(1990)-24044, there has been known a power transmission system for a vehicle which comprises a first power transmission path having a reduction gear and a second power transmission path having an infinitely variable gear and in which one of the first and second power transmission paths is selected according t the running condition of the vehicle.

For example, when the first power transmission path is selected, the starting acceleration performance can be improved by virtue of torque increasing function of the torque convertor, and when the second power transmission path is selected, a proper transmission ratio is obtained according to the running condition without causing shift shock by virtue of the infinitely variable gear.

In either of the power transmission systems disclosed in the above identified patent publications, a V-belt type infinitely variable gear is employed as the infinitely variable gear and a reduction gear comprising spur gears is employed as the reduction gear.

The V-belt type infinitely variable gear comprises a driving pulley mounted on an input shaft, a driven wheel mounted on an output shaft and a V-belt passed around the driving and driven pulleys, and in the V-belt type infinitely variable gear, the transmission ratio is changed by changing the widths of the peripheral grooves of the pulleys by means of hydraulic actuators. When such a V-belt type infinitely variable gear is employed, the diametrical size of the power transmission system is inherently enlarged since the input shaft and the output shaft of the V-belt type infinitely variable gear are disposed in parallel to each other. Further when the reduction gear comprises spur gears, the diametrical size of the power transmission system increases as the reduction gear ratio increases.

The problem is more serious in a front-engine front-drive vehicle since a tunnel portion which is formed in a floor panel of the passenger room and through which the power transmission system extends rearward must be large in diameter.

SUMMARY OF THE INVENTION

In view of the foregoing observations and description, the primary object of the present invention is to provide a power transmission system for a vehicle which has first and second power transmission paths to be selected according to the running condition of the vehicle and which is relatively small in the diametrical size.

The power transmission system in accordance with the present invention has a first power transmission path having a forward-reverse shift mechanism and a reduction gear, a second power transmission path having an infinitely variable gear, and a path switching means which switches the power transmission path between the first and second power transmission paths according to the running condition of the vehicle. The infinitely variable gear is formed of a toroidal speed change mechanism comprising an output disk fixed to the output shaft of the power transmission system, an input disk which can be displaced in the axial direction of the output shaft and a roller which is in contact with both the input and output disks to rotate about an axis in response to rotation of the input disk and transmit rotation of the input disk to the output disk, the transmission ratio of the toroidal speed change mechanism being changed by changing the inclination of the axis about which the roller rotates.

Since the toroidal speed change mechanism does not have a pair of shafts which are positioned in parallel to each other unlike the V-belt type infinitely variable gear and is smaller than the V-belt type infinitely variable gear in the diametrical size, the power transmission systems of the present invention may be small in the diametrical size as compared with the conventional power transmission systems where the V-belt type infinitely variable gear is employed.

In one preferred embodiment of the present invention, the power transmission system is further provided with a torque convertor connected between the path switching means and the output shaft of the engine and the reduction gear comprises a planetary gear mechanism, the planetary gear mechanism and the toroidal speed change mechanism being arranged coaxially with the torque convertor.

In another preferred embodiment of the present invention, the power transmission system is further provided with a torque convertor provided in said first power transmission path upstream of the reduction gear and the reduction gear comprises a planetary gear mechanism, the planetary gear mechanism and the toroidal speed change mechanism being arranged coaxially with the torque convertor.

When the planetary gear mechanism is employed as the reduction gear, a larger reduction ratio can be obtained without substantially enlarging the diametrical size.

Further, when the planetary gear mechanism and the toroidal speed change mechanism are in alignment with the output shaft of the torque convertor and accordingly, the diametrical size of the power transmission system can be small as compared with a case where these elements are arranged in parallel to each other.

DESCRIPTION OF THE PREFERRED EMBODIMENTS

Figure 1:
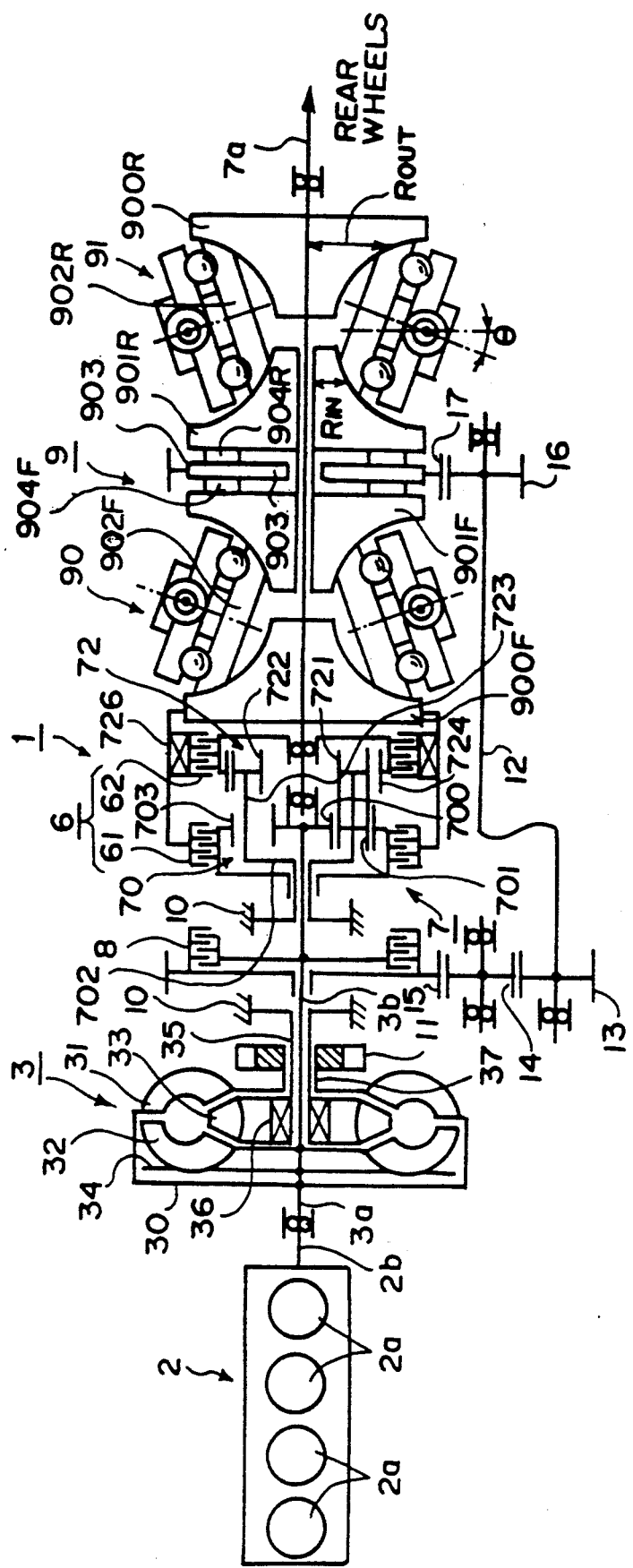
FIG. 1 is a schematic view showing a power transmission system in accordance with a first embodiment of the present invention.

In FIG. 1, an in-line four-cylinder engine 2 having four cylinders 2a is mounted on the front of a vehicle body with its output shaft 2b directed in the longitudinal direction of the vehicle body and output power of the engine 2 is transmitted to rear wheels through a power transmission system 1 in accordance with an embodiment of the present invention.

That is, the vehicle provided with the power transmission system 1 is a front-engine rear-drive vehicle.

Figure 2:
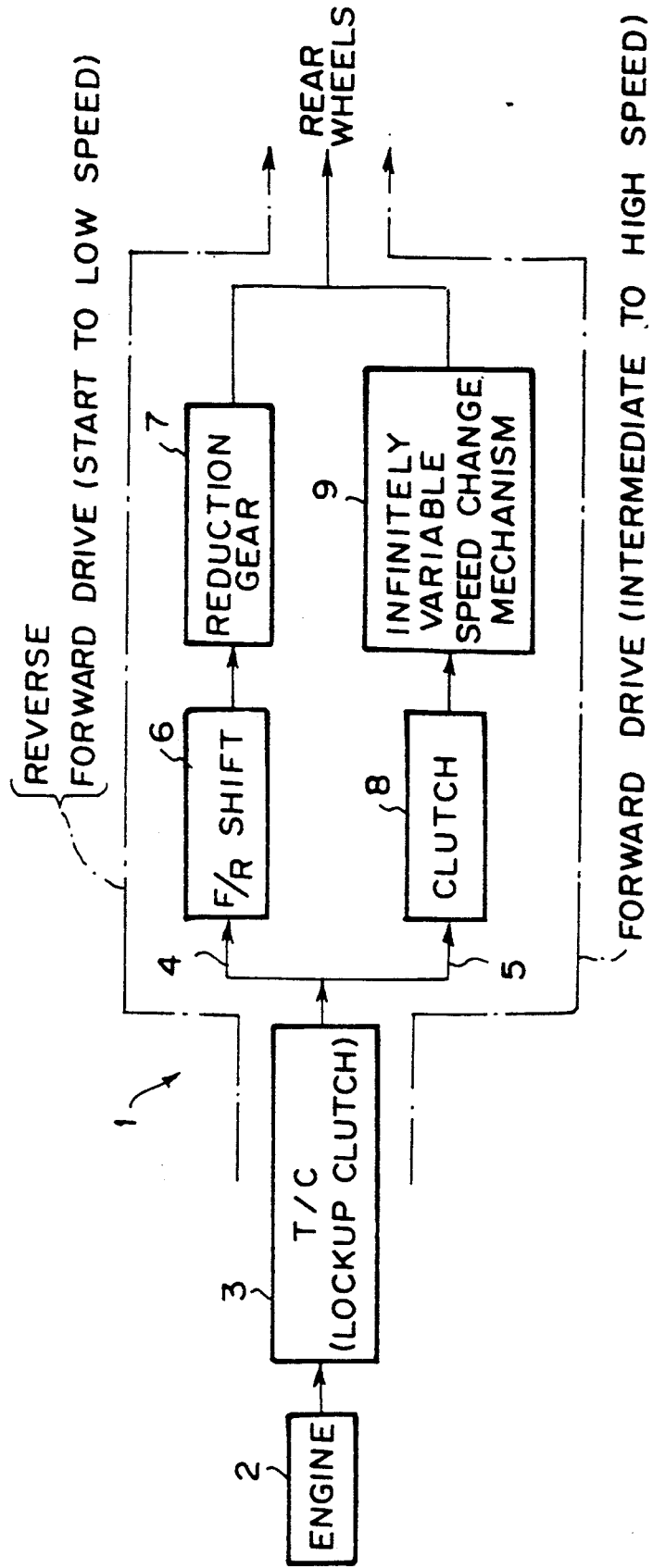
FIG. 2 is a block diagram schematically showing the power transmission paths in the first embodiment.

The power transmission system 1 comprises a torque convertor 3 (See also FIG. 2) with a lockup clutch and first and second power transmission paths 4 and 5 provided downstream of the torque convertor 3. The first power transmission path 4 includes a forward-reverse shift mechanism 6 for shifting between forward and reverse and a reduction gear 7. The second power transmission path 5 includes a path switching clutch 8 for switching between the first and second power transmission path 4 and 5, and an infinitely variable gear 9.

When the path switching clutch 8 is engaged, the engine output power is transmitted to the rear wheels through the second power transmission path 5 including the infinitely variable gear 9 and when the path switching clutch 8 is disengaged, the engine output power is transmitted to the rear wheels through the first power transmission path 4 including the reduction gear 7.

The torque convertor 3 has an input shaft 3a and an output shaft (turbine shaft) 3b which are coaxial with each other. The input shaft 3a is connected to the output shaft 2b of the engine 2 and the turbine shaft 3b is connected to the reduction gear 7.

A pump cover 30 is formed integrally with the input shaft 3a of the torque convertor 3 and hydraulic oil fills the inside of the pump cover 30. A pump impeller 31, a turbine liner 32, a stator 33 and a lockup clutch 34 are disposed inside the pump cover 30.

The pump impeller 31 is integral with the pump cover 30 and is opposed to the turbine liner 32 with the stator 33 intervening therebetween. The turbine shaft 3b is connected to the turbine liner 32. When the lockup clutch 34 is engaged, the input shaft 3a and the turbine shaft 3b are directly connected with each other.

The stator 33 is connected to a first hollow shaft 35 by way of a one-way clutch 36. The first hollow shaft 35 is integral with a casing 10 and is disposed coaxially with the turbine shaft 3b.

An oil pump 11 is provided on the rear end of a second hollow shaft 37 which is disposed coaxially with the turbine shaft 3b. The front end portion of the second hollow shaft 37 is formed integrally with the pump impeller 31. That is, the oil pump 11 is fixedly connected to the engine output shaft 2b by way of the pump cover 30, the pump impeller 31 and the second hollow shaft 37.

The reduction gear 7 comprises a pair of planetary gear mechanisms 70 and 72 which are arranged coaxially with the turbine shaft 3b with the planetary gear mechanism 70 disposed forward of the planetary gear mechanism 72. The planetary gear mechanism 70 is for reverse and the planetary gear mechanism 72 is for forward travel.

The reverse planetary gear mechanism 70 is of a single pinion type and comprises a sun gear 700 connected to the turbine shaft 3b, a pinion 701, a carrier 702 which supports the pinion 701 and is fixed to the casing 10 and a ring gear 703 connected to an output shaft 7a by way of a reverse clutch 61. The output shaft 7a is positioned coaxially with the turbine shaft 3b.

The forward planetary gear mechanism 72 is of a double pinion type and comprises an inner pinion 721 which is formed integrally with the pinion 701 of the reverse planetary gear mechanism 70 and an outer pinion 722. The sun gear 700 of the reverse planetary gear mechanism 70 doubles as the sun gear for the forward planetary gear mechanism 72. The inner pinion 721 and the outer pinion 722 are fixed to a carrier 723 which is formed integrally with the carrier 702 of the reverse planetary gear mechanism 70 and is fixed to the casing 10.

The forward planetary gear mechanism 72 further comprises a ring gear 724 which is connected to the output shaft 7a by way of a forward clutch 62 and a one-way clutch 726. The function of the one-way clutch 726 will be described in detail later.

The reverse clutch 61 and the forward clutch 62 form said forward-reverse shift mechanism 6, and when the reverse clutch 61 is engaged, the engine output power transmitted from the turbine shaft 3b is transmitted to the output shaft 7a through the reverse planetary gear mechanism 70 and the rear wheels are rotated in the reverse direction, while when the forward clutch 62 is engaged, the engine output power transmitted from the turbine shaft 3b is transmitted to the output shaft 7a through the forward planetary gear mechanism 72 and the rear wheels are rotated in the forward direction.

The infinitely variable gear 9 is disposed on the rear side of the reduction gear 7. The infinitely variable gear 9 comprises a pair of toroidal speed change mechanisms 90 and 91 which are arranged on the axis of the output shaft 7a with one toroidal speed change mechanism 90 disposed forward of the other.

The toroidal speed change mechanisms 90 and 91 are equal to each other in both the structure and the capacity, and accordingly, only the forward toroidal speed change mechanism 90 will be described, hereinbelow. In FIG. 1, the same elements of the forward and rearward toroidal speed change mechanisms 90 and 91 are given the same reference numerals while the reference numerals denoting the elements of the forward toroidal speed change mechanism 90 are added with 'F' and the reference numerals denoting the elements of the rearward toroidal speed change mechanism 91 are added with 'R'.

As is well known, the toroidal speed change mechanism 90 comprises a pair of disks 900 and 901 spaced from each other in the axial direction, and rollers 902 which are in contact with the disks 900 and 901. The disk 900 is fixed to the output shaft 7a and the disk 901 is rotatable relative to the output shaft 7a and slidable in the axial direction relative to the output shaft 7a. The engine output power is input from the movable disk 901. The disk 900 will be referred to as "the output disk 900" and the disk 901 will be referred to as "the input disk 901", hereinbelow.

The transmission ratio of the toroidal speed change mechanism 90 is changed by changing angle of inclination $\theta$ of the rollers 902 by a hydraulic actuator (not shown). That is, when the angle of inclination $\theta$ of the rollers 902 is changed, radius Rin at which the rollers 902 are in contact with the input disk 901 and radius Rout at which the rollers 902 are in contact with the output disk 900 changes and the ratio of the radius Rin to the radius Rout which governs the transmission ratio changes.

The forward toroidal speed change mechanism 90 and the rearward toroidal speed change mechanism 91 are positioned so that the input disks 901F and 901R are disposed inward and the output disks 900F and 900R are disposed outward.

An intermediate disk 903 is disposed between the input disks 901F and 901R to be rotatable relative to the input disks. Cams 904F and 904R are respectively disposed between the intermediate disk 903 and the input disk 901F and between the intermediate disk 903 and the input disk 901R, and as the input torque increases, the input disks 901F and 901R are pushed with more force.

The engine output power is transmitted to the input disks 901F and 901R through a bypass shaft 12 which is positioned in parallel to the first power transmission path 4.

That is, the bypass shaft 12 is disposed in parallel to the turbine shaft 3b and the output shaft 7a of the reduction gear 7 and is provided with a first gear 13 at its front end (the left end in FIG. 1). The first gear 13 is connected to a second gear 15 with an idle gear intervening therebetween. The second gear 15 is connected to the turbine shaft 3b by way of the path switching clutch 8.

A third gear 16 is formed on the rear end of the bypass shaft 12 integrally therewith and is in mesh with a fourth gear 17 which is formed integrally with the intermediate disk 903.

Figure 3:
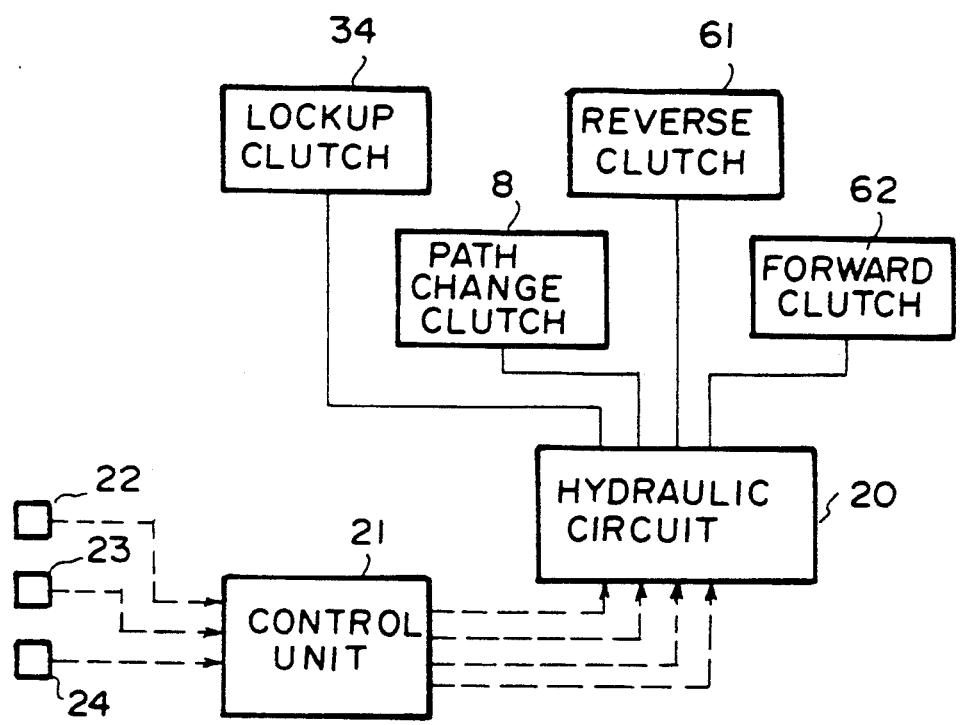
FIG. 3 is a schematic view showing a control system of the clutches in the first embodiment.

The clutches 8, 34, 61 and 62 are engaged and disengaged by a hydraulic circuit 20 as shown in FIG. 3. That is, the hydraulic circuit 20 has a plurality of electromagnetic valves (not shown) for changing lines and the electromagnetic valves are turned on and off on the basis of signals from a control unit 21 to engage and disengage the clutches.

The control unit 21 may comprise a microcomputer and signals from a vehicle speed sensor 22, an accelerator position sensor 23 which detects the amount of depression of the accelerator pedal and a shift position sensor 24 which detects the position of a manual shift lever (not shown) which can be put in F (forward), R (reverse) or N (neutral).

The operation of the control unit 21 except that concerning to the lockup clutch 34 is as follows.

Reverse

The reverse clutch 61 is in engaged state and the forward clutch 62 and the path switching clutch 8 are in disengaged state. That is, when the vehicle is to be reversed, the engine output power is transmitted to the rear wheels through the first power transmission path 4.

Neutral

The clutches 8, 61 and 62 are all in disengaged state.

Forward Drive (1) From start to low speed travel

The forward clutch 62 is in engaged state and the reverse clutch 61 is in disengaged state, and at the same time, the path switching clutch 8 is in engaged state. In this state, the engine output power can be transmitted to the rear wheels through either of the first power transmission path 4 and the second power transmission path 5.

The one-way clutch 726 is arranged to lock when the rotational speed on the engine side is higher than that on the rear wheel side, and accordingly, when rotational speed on the engine side is higher than that on the rear wheel side as during starting, the engine output power is transmitted to the rear wheels through the first power transmission path 4.

The path switching clutch 8 is engaged while the accelerator pedal is in released state.

(2) From middle speed travel to high speed travel

The forward clutch 62 is in engaged state and the reverse clutch 61 is in disengaged state, and at the same time, the path switching clutch 8 is in engaged state. When the vehicle comes to cruise in this state, the one-way clutch 726 is released and the engine output power is transmitted to the rear wheels through the second power transmission path 5 including the infinitely variable gear 9. When the vehicle is to be accelerated in this range, the one-way clutch 726 locks and the engine output power is transmitted to the rear wheels through the first power transmission path 4.

The above states are shown in table 1.

TABLE 1

|  |  | REVERSE | | FORWARD | | |
|---|---|---|---|---|---|---|
|  |  | ← REVERSE T/C RANGE → | | ← FORWARD T/C RANGE → | | |
|  | ACCEL. |  | N |  | ←| IVM RANGE → |
| REVERSE | ON | ○ | X | X | | X |
| CLUTCH 61 | OFF | ○ | X | X | | X |
| FORWARD | ON | X | X | ○ (LOCK) | | ○ (FREE) |
| CLUTCH 62 | OFF | X | X | ○ (FREE) | | ○ (FREE) |
| P/C CLUTCH | ON | X | X | X | | ○ |
| 8 | OFF | X | X | ○ | | ○ |

○: LOCK
X: FREE
( ): ONE-WAY CLUTCH
IVM: infinitely variable speed change mechanism The lockup clutch 34 is controlled in the following manner. That is, when the vehicle is reversed or the vehicle is started forward or is driven forward at a low speed, the lockup clutch 34 is disengaged and torque increasing function of the torque convertor is utilized.

When the vehicle travels at an intermediate-to-high speed, the lockup clutch 34 is basically engaged. However when a state where torque shock is apt to occur is established, e.g., when the vehicle is accelerated and the engine output torque quickly changes, the lockup clutch 34 is disengaged in order to absorb the torque shock.

Figure 4:
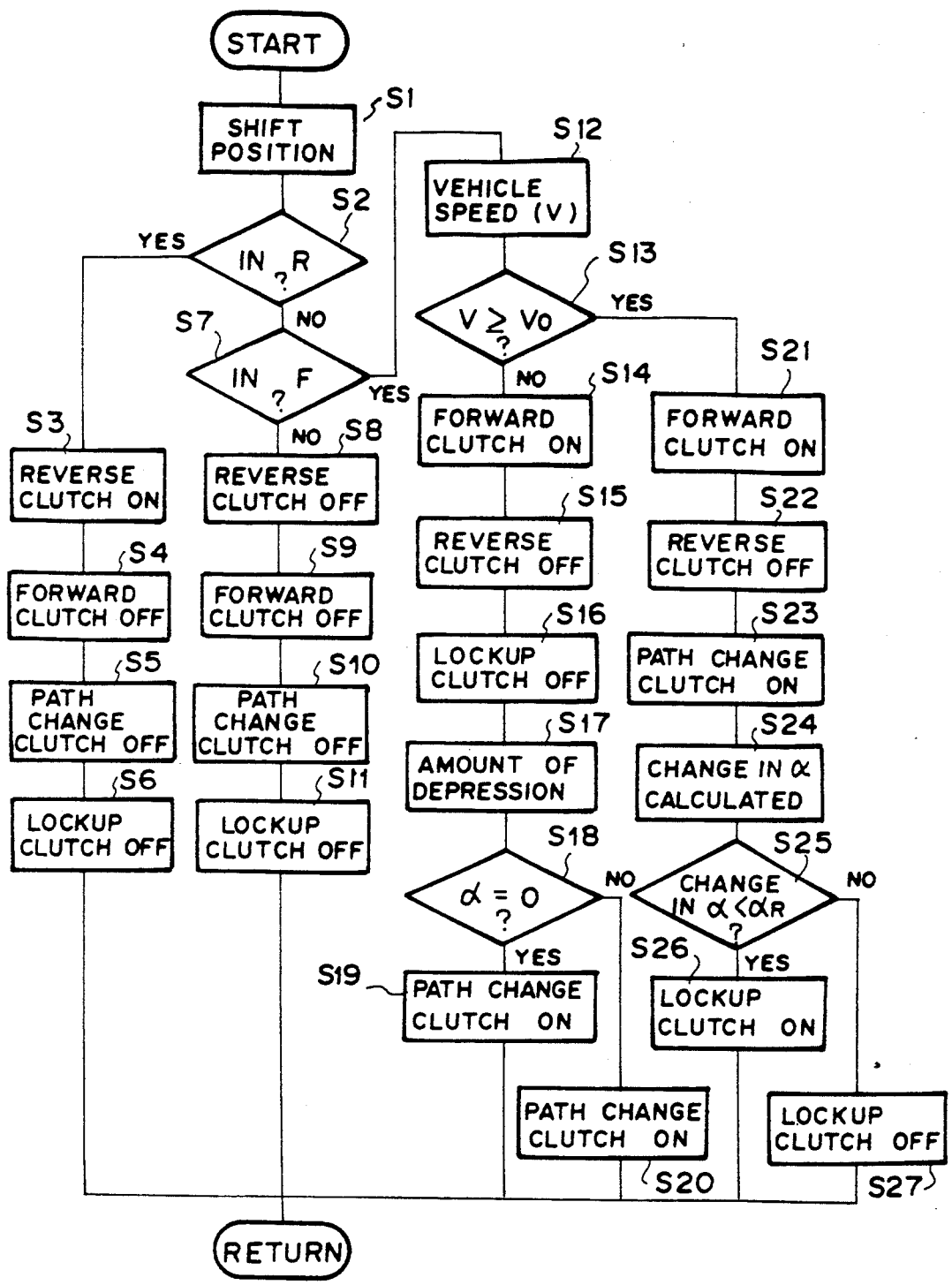
FIG. 4 is a flow chart for illustrating the operation of the control unit shown in FIG. 3.

FIG. 4 is a flow chart according to which the control unit 21 performs the control described above.

As shown in FIG. 4, the control unit 21 first reads the position of the manual shift lever in step S1 and then determines in step S2 whether the manual shift lever is in R. When it is determined in step S2 that the manual shift lever is in R, the control unit 21 causes the reverse clutch 61 to engage, the forward clutch to disengage, the path switching clutch 8 to disengage and the lockup clutch 34 to disengage. (steps S3 to S6) Thus, when the manual shift lever is in R, the engine output power is transmitted to the rear wheels through the torque convertor 3 and the first power transmission path 4.

When it is determined in step S2 that the manual shift lever is not in R, the control unit 21 determines in step S7 whether the manual shift lever is in F. When it is determined that the manual shift lever is not in F, i.e., when the manual shift lever is in N, the control unit 21 causes the reverse clutch 61, the forward clutch 62, the path switching clutch 8 and the lockup clutch 34 to disengage. (steps S8 to S11) When it is determined in step S7 that the manual shift lever is in F, the control unit 21 reads the vehicle speed V in step S12. Then in step S13, the control unit 21 determines whether the actual vehicle speed V is not lower than a predetermined value Vo.

When it is determined in step S13 that the actual vehicle speed V is lower than the predetermined value Vo, i.e., when the vehicle is starting or running at a low speed, the control unit 21 causes the forward clutch 62 to engage and the reverse clutch 61 and the lockup clutch 34 to disengage. (steps S14 to S16)

Thus when the vehicle is starting or running at a low speed, the engine output power is transmitted to the rear wheels through the torque convertor 3.

Then the control unit 21 reads the amount of depression α of the accelerator pedal. (step S17) Thereafter, the control unit 21 determines in step S18 whether the amount of the depression α of the accelerator pedal is 0, i.e., whether the accelerator pedal has been released. When it is determined that the amount of depression α of the accelerator pedal is 0, the control unit 21 causes the path switching clutch 8 to engage. (step S19) Otherwise the control unit 21 causes the path switching clutch 8 to disengage. (step S20)

When it is determined in step S13 that the actual vehicle speed V is not lower than the predetermined value Vo, the control unit 21 causes the forward clutch 62 to engage, the reverse clutch 61 to disengage and the path switching clutch 8 to engage (steps S21 to S23)

Thus when the vehicle is running at an intermediate-to-high speed, the engine output power is transmitted to the rear wheels through the infinitely variable gear 9.

Then the control unit 21 calculates the change in the amount of the depression α of the accelerator pedal (step S24), and determined in step S25 whether the change in the amount of the depression α of the accelerator pedal is smaller than a predetermined value $a_R$. When it is determined that the former is smaller than the latter, the control unit 21 cause the lockup clutch 34 to engage. (step S26) Otherwise the control unit 21 causes the lockup clutch 34 to disengage since it indicates that the engine output power can changes quickly. (step S27)

Figure 5:
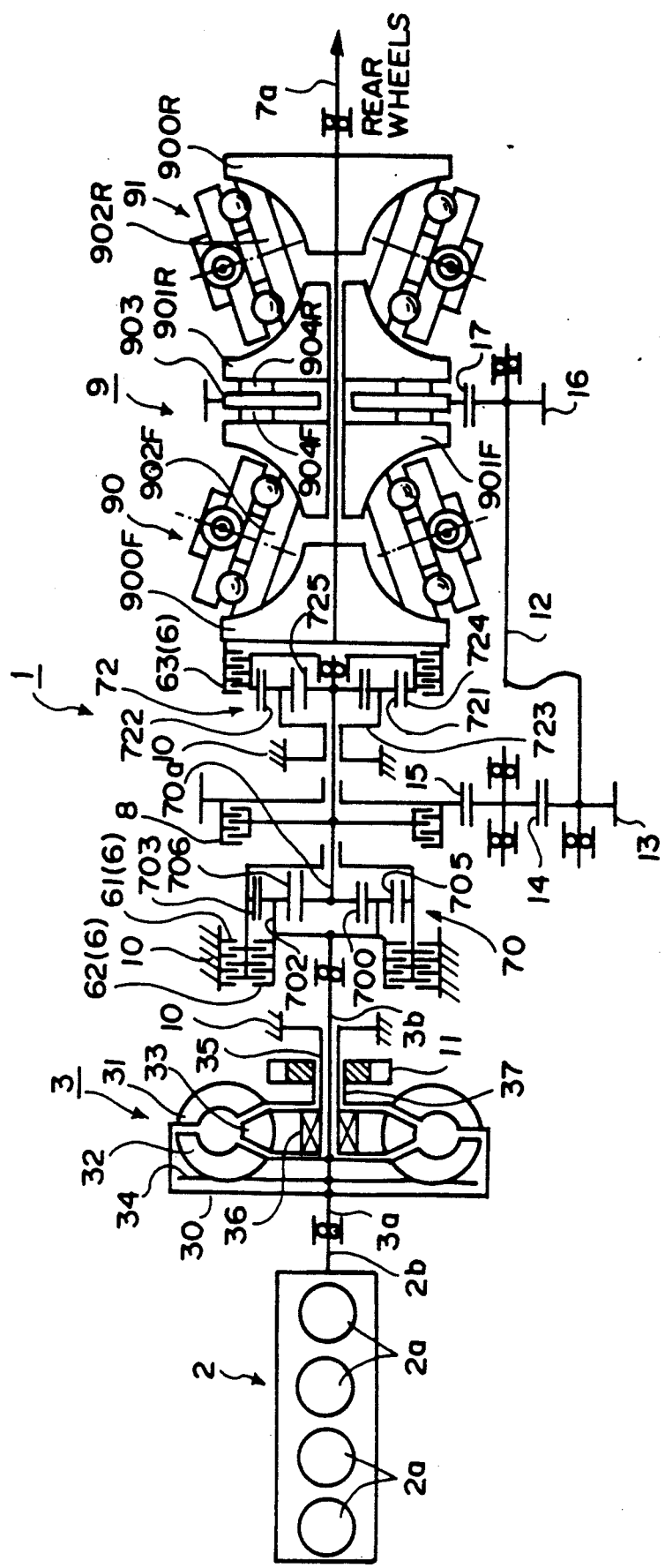
FIG. 5 is a view similar to FIG. 1 but showing a second embodiment of the present invention.
Figure 6:
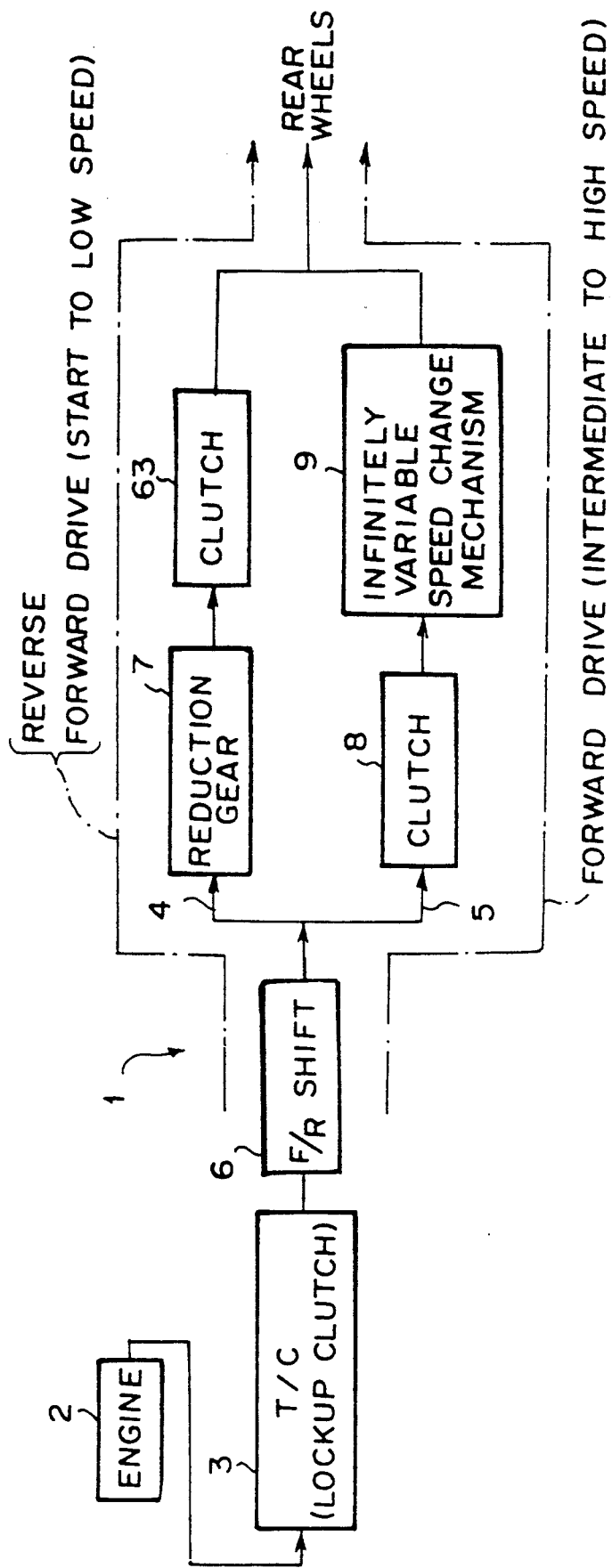
FIG. 6 is a view similar to FIG. 2 but showing the power transmission paths in the second embodiment.
Figure 7:
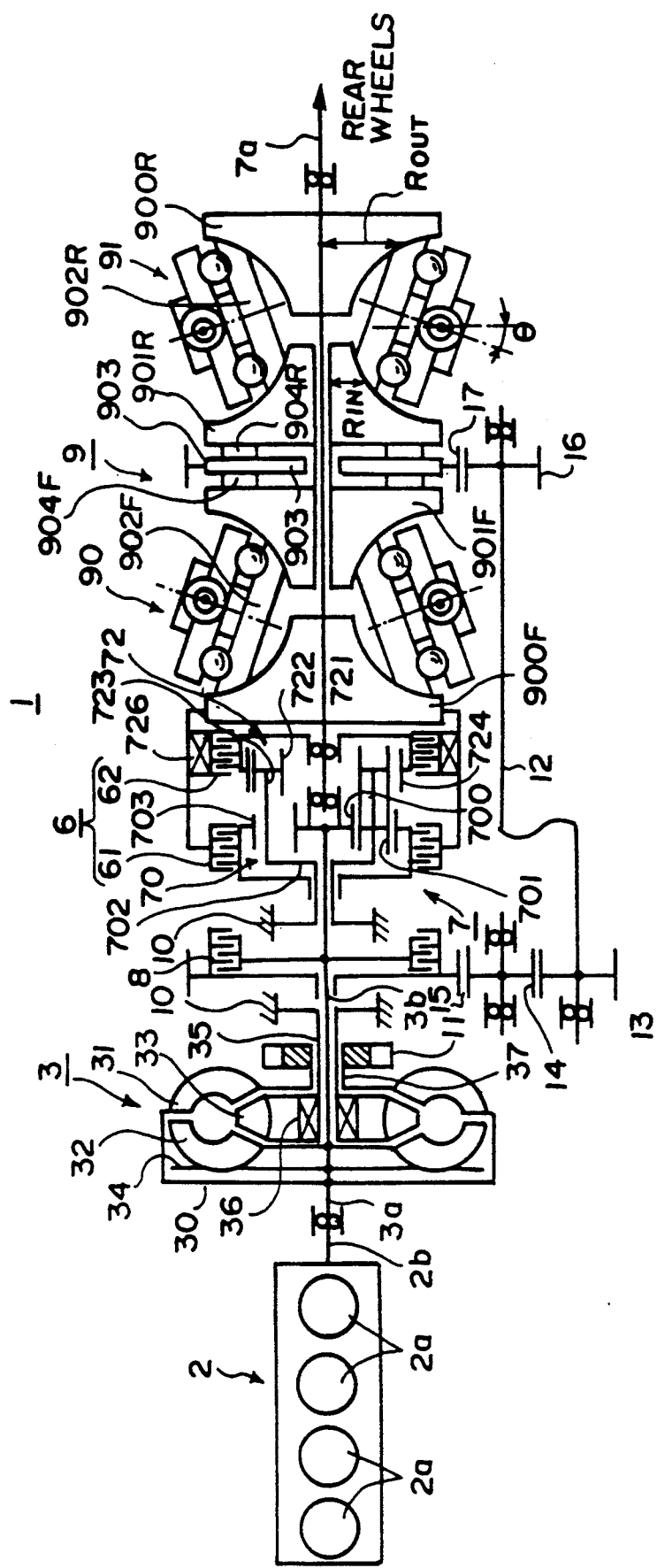
FIG. 7 is a view similar to FIG. 1 but showing a third embodiment of the present invention.

FIGS. 5 to 7 show other embodiments of the present invention. In the following description of these embodiments, the elements analogous to those in the embodiment described above are given the same reference numerals and will not be described, and only the difference from the embodiment described above will be described, hereinbelow.

FIGS. 5 and 6 show a power transmission system in accordance with a second embodiment of the present invention.

In this embodiment, the forward reverse shift mechanism 6 is disposed between the torque convertor 3 and the reduction gear 7 and a second forward clutch 63 is disposed on the rear side of the reduction gear 7.

As shown in detail in FIG. 5, the reverse planetary gear mechanism 70 is of a double pinion type in this embodiment, and a carrier 702 on which inner and outer pinions 705 and 705 are fixedly mounted is connected to the turbine shaft 3b. A first forward clutch 62 is disposed between the carrier 702 and a ring gear 703, and a reverse clutch 703 is disposed between the ring gear 703 and the casing 10. Further, the reverse planetary gear mechanism 70 has an output shaft 70a which is connected to a sun gear 700.

When the reverse clutch 61 is engaged and the first forward clutch 62 is disengaged, the ring gear 703 is held stationary, and the engine output power is input from the carrier 702 and output from the sun gear 700. That is, when the reverse clutch 61 is engaged and the first forward clutch 62 is disengaged, the pinions 705 and 706 moves around the sun gear 700 while rotating on their shafts, and accordingly, the carrier 702 and the sun gear 700 rotate in opposite directions. (reverse)

On the other hand, when the reverse clutch 61 is disengaged and the first forward clutch 62 is engaged, the ring gear 703 and the carrier 702 is held stationary relative to each other and the rotation of the pinions 05 and 706 on their shafts is prevented, whereby the carrier 702 and the sun gear 700 rotate in the same direction.

The output shaft 70a of the reverse planetary gear mechanism 70 is connected to the sun gear 725 of the forward planetary gear mechanism 72. The second gear 15 and the path switching clutch 8 are disposed on an intermediate portion of the output shaft 70a.

The second forward clutch 63 is disposed between the ring gear 724 of the forward planetary gear mechanism 72 and the output shaft 7a (the output disk 900F of the toroidal speed change mechanism, and there is provided no one-way clutch between the second forward clutch 63 and the output disk 900F.

In this embodiment, when the vehicle is reversed, the path switching clutch 8 and the first forward clutch 62 are disengaged and the reverse clutch 61 and the second forward clutch 63 are engaged.

While the manual shift lever is in F where the reverse clutch 61 is in disengaged stated, the path switching clutch 8 is disengaged and the first and second forward clutches 62 and 63 are engaged when the vehicle is starting or running at a low speed, and the path switching clutch 8 and the first forward clutch 62 are engaged and the second forward clutch 63 is disengaged.

The third embodiment shown in FIG. 7 is substantially the same in structure as the first embodiment shown in FIG. 1 except that the torque convertor 3 is not provided with a lockup clutch.

In this embodiment, in a running condition where the torque increasing function of the torque convertor 3 is not utilized, e.g., when the vehicle is cruising, the path switching clutch 8 is engaged and the engine output power is transmitted to the rear wheels through the second power transmission path 5 including the infinitely variable gear 9. In a running condition where the torque increasing function of the torque convertor 3 is utilized, e.g., when the vehicle is starting, the path switching clutch 8 is disengaged and the engine output power is transmitted to the rear wheels through the first power transmission path 4 including the reduction gear 7.

Since the toroidal speed change mechanism does not have a pair of shafts which are positioned in parallel to each other unlike the V-belt type infinitely variable gear and is smaller than the V-belt type infinitely variable gear in the diametrical size, the power transmission systems of the embodiments described above may be small in the diametrical size as compared with the conventional power transmission systems where the V-belt type infinitely variable gear is employed.

Further, in the embodiments described above, a larger reduction ratio can be obtained without substantially enlarging the diametrical size since the planetary gear mechanism is employed as the reduction gear.

Further, in the embodiments described above, the planetary gear mechanism and the toroidal speed change mechanism are in alignment with the output shaft of the torque convertor and accordingly, the diametrical size of the power transmission system can be small as compared with a case where these elements are arranged in parallel to each other.

Figure 8:
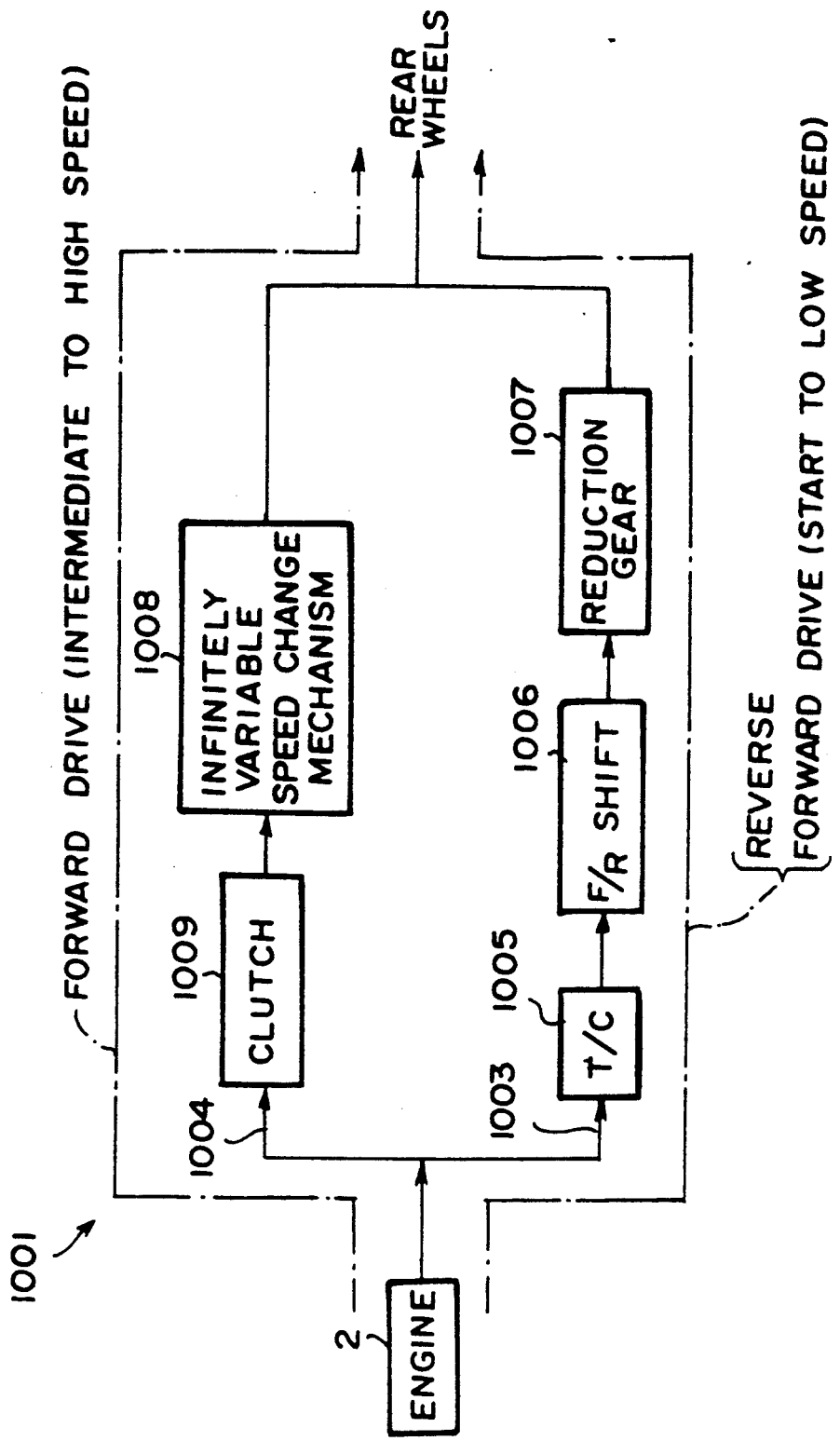
FIG. 8 is a block diagram schematically showing the power transmission paths in a power transmission system in accordance with a fourth embodiment of the present invention shown in FIG. 9.

A fourth embodiment of the present invention will be described with reference to FIGS. 8 and 9, hereinbelow.

The power transmission system 1001 of this embodiment has first and second power transmission paths 1003 and 1004. The first power transmission path 1003 includes a torque convertor 1005, a forward-reverse shift mechanism 1006 for shifting between forward and reverse and a reduction gear 1007. The second power transmission path 1004 includes a path switching clutch 1009 for switching between the first and second power transmission path 1003 and 1004, and an infinitely variable gear 1008.

When the path switching clutch 1009 is engaged, the engine output power is transmitted to the rear wheels through the second power transmission path 1004 including the infinitely variable gear 1008 and when the path switching clutch 1009 is disengaged, the engine output power is transmitted to the rear wheels through the first power transmission path 1003 including the torque convertor 1005 and the reduction gear 1007.

Figure 9:
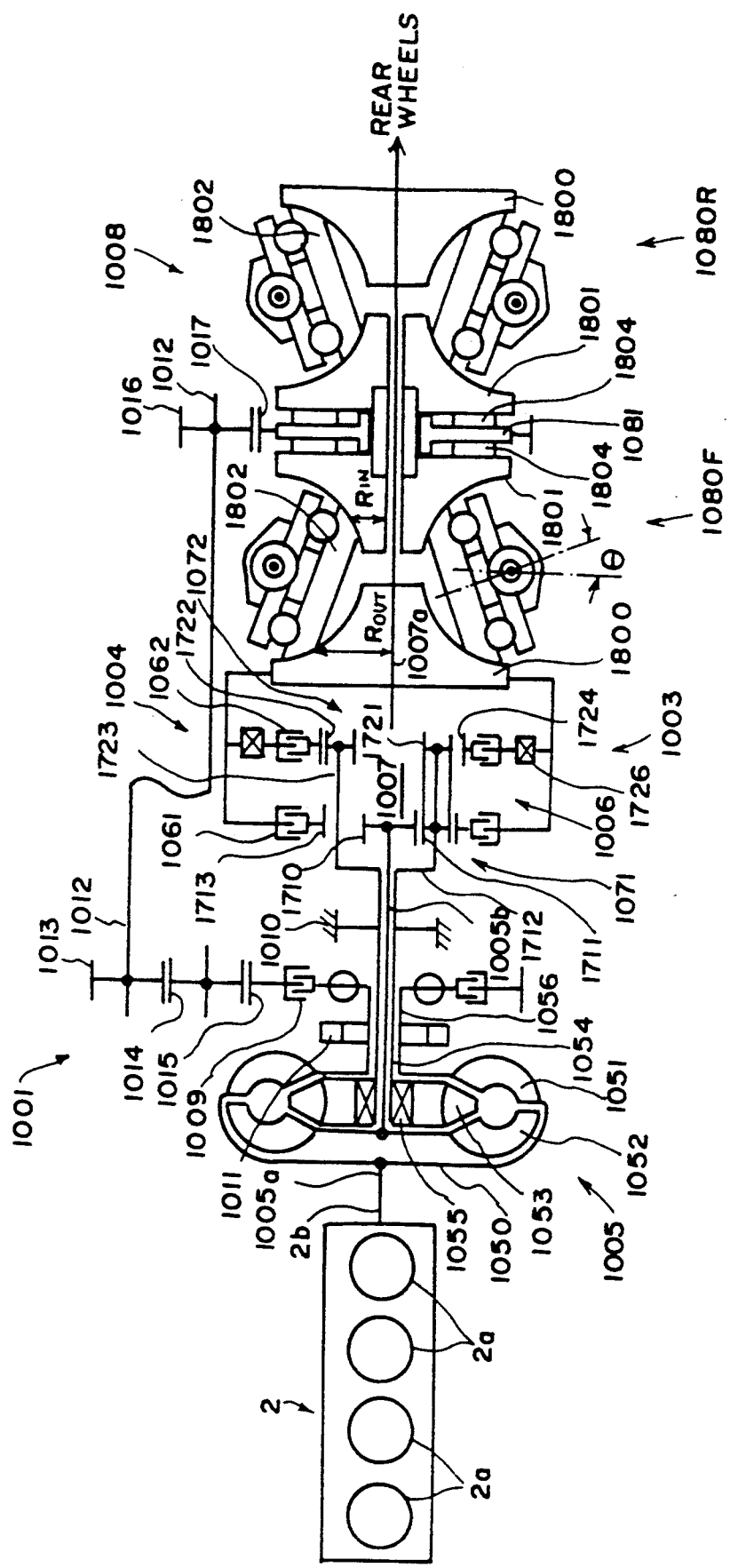
FIG. 9 is a view similar to FIG. 1 but showing the fourth embodiment of the present invention.
Figure 10:
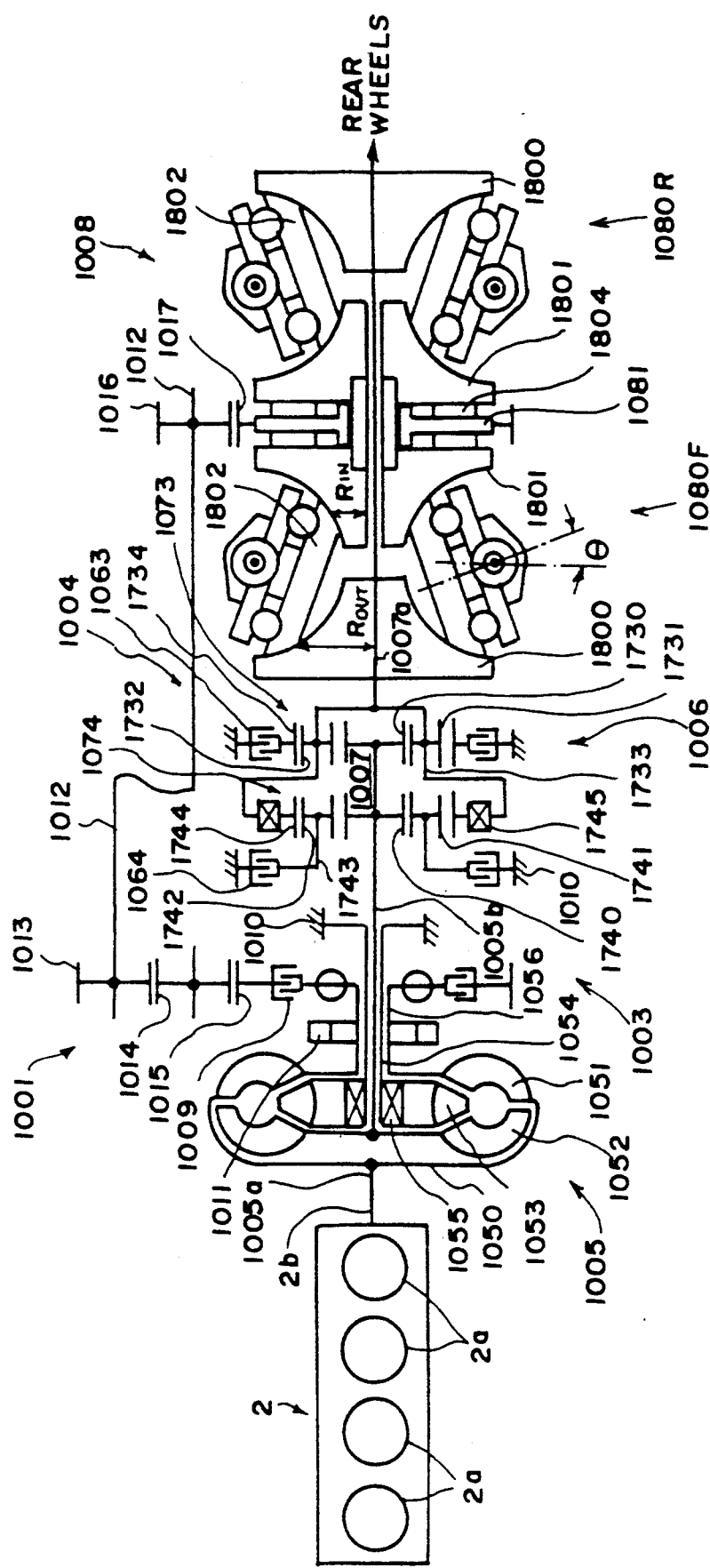
FIG. 10 is a view similar to FIG. 1 but showing a fifth embodiment of the present invention.

As shown in FIG. 9, in the first power transmission path 1003, the torque convertor 1005 and the reduction gear 1007 are arranged in series from the engine side toward the rear wheel side.

The torque convertor 3 has an input shaft 1005a and an output shaft (turbine shaft) 1005b which are coaxial with each other. The input shaft 1005a is connected to the output shaft 2b of the engine 2 and the turbine shaft 1005b is connected to the reduction gear 1007.

A pump cover 1050 is formed integrally with the hydraulic oil fills the inside of the pump cover 1050. A pump impeller 1051, a turbine liner 1052 and a stator 1053 are disposed inside the pump cover 1050.

The pump impeller 1051 is integral with the pump cover 1050 and is opposed to the turbine liner 1052 with the stator 1053 intervening therebetween. The turbine shaft 1005b is connected to the turbine liner 1052.

The stator 1053 is connected to a first hollow shaft 1054 by way of a one-way clutch 1055. The first hollow shaft 1054 is integral with a casing 1010 and is disposed coaxially with the turbine shaft 1005b.

An oil pump 1011 is provided on the rear end of a second hollow shaft 1056 which is disposed coaxially with the turbine shaft 1005b. The front end portion of the second hollow shaft 1056 is formed integrally with the pump impeller 1051. That is, the oil pump 1011 is fixedly connected to the engine output shaft 2b by way of the pump cover 1050, the pump impeller 1051 and the second hollow shaft 1056.

The reduction gear 1007 comprises a pair of planetary gear mechanisms 1071 and 1072 which are arranged coaxially with the turbine shaft 1005b with the planetary gear mechanism 1071 disposed forward of the planetary gear mechanism 1072. The planetary gear mechanism 1071 is for reverse and the planetary gear mechanism 1072 is for forward travel.

The reverse planetary gear mechanism 1071 is of a single pinion type and comprises a sun gear 1710 connected to the turbine shaft 1005b, a pinion 1711, a carrier 1712 which supports the pinion 1711 and is fixed to the casing 1110 and a ring gear 1713 connected to an output shaft 1007a by way of a reverse clutch 1061. The output shaft 1007a is positioned coaxially with the turbine shaft 1005b.

The forward planetary gear mechanism 1072 is of a double pinion type and comprises an inner pinion 1721 which is formed integrally with the pinion 1711 of the reverse planetary gear mechanism 1071 and an outer pinion 1722. The sun gear 1710 of the reverse planetary gear mechanism 1071 doubles as the sun gear for the forward planetary gear mechanism 1072. The inner pinion 1721 and the outer pinion 1722 are fixed to a carrier 1723 which is formed integrally with the carrier 1712 of the reverse planetary gear mechanism 1071 and is fixed to the casing 1010 by way of the second hollow shaft 1054.

The forward planetary gear mechanism 1072 further comprises a ring gear 1724 which is connected to the output shaft 1007a by way of a forward clutch 1062 and a one-way clutch 1726. The function of the one-way clutch 1726 will be described in detail later The reverse clutch 1061 and the forward clutch 1062 form said forward-reverse shift mechanism 1006, and when the reverse clutch 1061 is engaged, the engine output power transmitted from the turbine shaft 1005b is transmitted to the output shaft 1007a through the reverse planetary gear mechanism 1071 and the rear wheels are rotated in the reverse direction, while when the forward clutch 1062 is engaged, the engine output power transmitted from the turbine shaft 1007b is transmitted to the output shaft 1007a through the forward planetary gear mechanism 1072 and the rear wheels are rotated in the forward direction.

In the second power transmission path 1004, the infinitely variable gear 1008 is disposed on the rear side of the reduction gear 1007. The infinitely variable gear 1008 comprises a pair of toroidal speed change mechanisms 1080F and 1080R which are arranged on the axis of the output shaft 1007a with one toroidal speed change mechanism 1080F disposed forward of the other.

The toroidal speed change mechanisms 1080F and 1080R are equal to each other in both the structure and the capacity, and accordingly, only the forward toroidal speed change mechanism 1080F will be described, hereinbelow. In FIG. 9, the same elements of the forward and rearward toroidal speed change mechanisms 1080F and 1080R are given the same reference numerals.

As is well known, the toroidal speed change mechanism 1080F comprises a pair of disks 1800 and 1801 spaced from each other in the axial direction, and rollers 1802 which are in contact with the disks 1800 and 1801. The disk 1800 is fixed to the output shaft 1007a and the disk 1801 is rotatable relative to the output shaft 1007a and slidable in the axial direction relative to the output shaft 1007a. The engine output power is input from the movable disk 1801. The disk 1800 will be referred to a "the output disk 1800" and the disk 1801 will be referred to as "the input disk 1801", hereinbelow.

The transmission ratio of the toroidal speed change mechanism 1080F is changed by changing angle of inclination $\theta$ of the rollers 1802 by a hydraulic actuator (not shown) as in the first embodiment.

The forward toroidal speed change mechanism 1080F and the rearward toroidal speed change mechanism 1080R are positioned so that the input disks 1801 are disposed inward and the output disks 1800 are disposed outward.

An intermediate disk 1081 is disposed between the input disks 1801 to be rotatable relative to the input disks. Cams 1804 are respectively disposed between the intermediate disk 1081 and the input disk 1801, and as the input torque increases, the input disks 1801 are pushed with more force.

The engine output power is transmitted to the input disks 1801 through a bypass shaft 1012 which is positioned in parallel to the first power transmission path 1003.

That is, the bypass shaft 1012 is disposed in parallel to the turbine shaft 1005b and the output shaft 1007a of the reduction gear 1007 and is provided with a first gear 1013 at its front end (the left end in FIG. 9). The first gear 1013 is connected to a second gear 1015 with an idle gear 1014 intervening therebetween. The second gear 1015 is connected to the second hollow shaft 1056 by way of the path switching clutch 1009. That is, the front end of the bypass shaft 1012 is connected to the pump impeller 1051 which is the input element of the torque convertor 1005.

A third gear 1016 is formed on the rear end of the bypass shaft 1012 integrally therewith and is in mesh with a fourth gear 1017 which is formed integrally with the intermediate disk 1081.

The clutches 1009, 1061 and 1062 are engaged and disengaged by a hydraulic circuit which is not shown. The relation between the states of the clutches 1009, 1061 and 1062 and the running conditions of the vehicle will be described, hereinbelow.

Reverse

The reverse clutch 1061 is in engaged state and the forward clutch 1062 and the path switching clutch 1009 are in disengaged state. That is, when the vehicle is to be reversed, the engine output power is transmitted to the rear wheels through the first power transmission path 1003. In this state, since the carrier 1712 of the reverse planetary gear mechanism 1071 is held state and the engine output power is input from the sun gear 1710 and output through the ring gear 1713 as reduced reverse rotation.

Neutral

The clutches 1009, 1061 and 1062 are all in disengaged state.

Forward Drive (1) From start to low speed travel

The forward clutch 1062 is in engaged stat and the reverse clutch 1061 is in disengaged state, and at the same time, the path switching clutch 1009 is in disengaged state. In this state, the engine output power can be transmitted to the rear wheels through the first power transmission path 1003. In this state, the engine output power is input from the sun gear 1710 of the reverse planetary gear mechanism 1071 and output through the ring gear 724 of the forward planetary gear mechanism 1072 as reduced regular rotation.

The one-way clutch 1726 between the ring gear 1724 and the output shaft 1007a is arranged to lock when the rotational speed on the engine side is higher than that on the rear wheel side, and accordingly, when rotational speed on the engine side is higher than that on the rear wheel side as during starting, the engine output power is transmitted to the rear wheels through the first power transmission path 1003. That is, during starting, the torque increasing function of the torque convertor 1005 is utilized.

When the path switching clutch 1009 is engaged while the accelerator pedal is in released state, engine brake effect can be obtained.

(2) From middle speed travel to high speed travel

The forward clutch 1062 is in engaged state and the reverse clutch 1061 is in disengaged state, and at the same time, the path switching clutch 1009 is in engaged state. When the vehicle comes to cruise in this state, the one-way clutch 1726 is released and the engine output power is transmitted to the rear wheels through the second power transmission path 1004 including the infinitely variable gear 1008. When the vehicle is accelerated from a state where the accelerator pedal is released, the one-way clutch 1726 locks in response to disengagement of the path switching clutch 1009 and the engine output power is transmitted to the rear wheels through the first power transmission path 1003, whereby the torque increasing function of the torque convertor 1005 is utilized.

The above states are shown in table 2.

TABLE 2

| | | | REVERSE | | FORWARD | | |
| | | | | | FORWARD T/C RANGE | | |
| | ACCEL. | | REVERSE T/C RANGE | N | | | IVM RANGE |
|---|---|---|---|---|---|---|---|
| REVERSE | ON | | O | X | X | | X |
| CLUTCH | OFF | | O | X | X | | X |

TABLE 2-continued

| | | REVERSE | | | FORWARD | |
| | | ←REVERSE T/C RANGE→ | | | ←FORWARD T/C RANGE→ | |
| | | | | | | ←IVM RANGE→ |
| | ACCEL. | | | N | | |
| --- | --- | --- | --- | --- | --- | --- |
| 1061 FORWARD CLUTCH | ON | X | X | | ○ (LOCK) - | ○ (FREE) |
| | OFF | X | X | | ○ (FREE) | ○ (FREE) |
| 1062 P/C CLUTCH | ON | X | X | | X | |
| 1009 | OFF | X | X | | ○ | ○ |

○: LOCK
X: FREE
( ): ONE-WAY CLUTCH
IVM: infinitely variable speed change mechanism The power transmission system of this embodiment also may be small in the diametrical size as compared with the conventional power transmission systems where the V-belt type infinitely variable gear is employed.

Further, in this embodiment, a larger reduction ratio can be obtained without substantially enlarging the diametrical size since the planetary gear mechanism is employed as the reduction gear.

Further, also in this embodiment, the planetary gear mechanism and the toroidal speed change mechanism are in alignment with the output shaft of the torque convertor and accordingly, the diametrical size of the power transmission system can be small as compared with a case where these elements are arranged in parallel to each other.

Further, in this embodiment, the planetary gear mechanisms 1071 and 1072 and the toroidal speed change mechanisms 1080F and 1080R are arranged in this order from the engine side, and accordingly, the output of the planetary gear mechanisms 1071 and 1072 can be output by use of the output shaft of the toroidal speed change mechanisms 1080F and 1080R. That is, since the output disks 1800 of the toroidal speed change mechanisms 1080F and 1080R can be mounted on the output shaft 1007a of the planetary gear mechanisms 1071 and 1072, the output of the planetary gear mechanisms 1071 and 1072 can be easily taken out.

Further since the planetary gear mechanisms 1071 and 1072 and the toroidal speed change mechanisms 1080F and 1080R are positioned adjacent to each other, the forward clutch 1061 and the reverse clutch 1062 can be directly connected to the output disks 1800 of the toroidal speed change mechanisms 1080F and 1080R and no mechanism need be separately provided to take out the output of the planetary gear mechanisms 1071 and 1072.

Further in this embodiment, since the infinitely variable gear 1008 is formed of a pair of toroidal speed change mechanisms 1080F and 1080R which are arranged in parallel, each toroidal speed change mechanism may be small in capacity and the power transmission system may be small in the diametrical size as compared with a case where the infinitely variable gear is formed of a single toroidal speed change mechanism.

The fifth embodiment of the present invention is substantially the same as the fourth embodiment except the structure of the forward-reverse shift mechanism 1006 and the reduction gear 1007.

In this embodiment, the reduction gear 1007 comprises a pair of planetary gear mechanisms 1073 and 1074 which are arranged coaxially with the turbine shaft 1005b with the planetary gear mechanism 1074 disposed forward of the planetary gear mechanism 1073. The planetary gear mechanism 1073 is for reverse and the planetary gear mechanism 1074 is for forward travel.

The reverse planetary gear mechanism 1073 is of a double pinion type and comprises a sun gear 1730 connected to the turbine shaft 1005b, pinions 1731 and 1732, a carrier 1733 which supports the pinions 1731 and 1732 and is fixed to the output shaft 1007a, and a ring gear 1734 which is connected to the casing 1010 by way of a reverse brake 1063.

The forward planetary gear mechanism 1074 is also of a double pinion type and comprises a sun gear 1740 connected to the turbine shaft 1005b, pinions 1741 and 1742, a carrier 1743 which supports the pinions 1731 and 1732 and is connected to the casing 1010 by way of a forward brake 1064, and a ring gear 1744 which is connected to the output shaft 1007a by way of a one-way clutch 1745 and the carrier 1733 of the reverse planetary gear mechanism 1073.

The brakes 1063 and 1064 are applied and released and the path switching clutch 1009 is engaged and disengaged by a hydraulic circuit which is not shown. The relation between the states of the brakes 1063 and 1064 and the path switching clutch 1009 and the running conditions of the vehicle will be described, hereinbelow.

Reverse

The reverse brake 1063 is in applied state and the forward brake 1064 and the path switching clutch 1009 are in released state. That is, when the vehicle is to be reversed, the engine output power is transmitted to the rear wheels through the first power transmission path 1003. In this state, since the ring gear 1734 of the reverse planetary gear mechanism 1073 is held state and the engine output power is input from the sun gear 1730 and output through the carrier 1733 as reduced reverse rotation.

Neutral

The clutches 1009 and the brakes 1063 and 1064 are all in released state.

Forward Drive (1) From start to low speed travel

The forward brake 1064 is in applied state and the reverse brake 1063 and the path switching clutch 1009 are in released state. In this state, the engine output power can be transmitted to the rear wheels through the first power transmission path 1003 and the carrier 1743 of the forward planetary gear mechanism 1074 is held stationary, whereby the engine output power is input from the sun gear 1740 and output through the ring gear 744 as reduced regular rotation.

The one-way clutch 1745 between the ring gear 1744 and the output shaft 1007a is arranged to lock when the rotational speed on the engine side is higher than that on the rear wheel side so that the ring gear 1744 is fixed to the output shaft 1007a by way of the carrier 1733 of the reverse planetary gear mechanism 1073 and the engine output power is transmitted to the rear wheels.

Though the one-way clutch 1745 is disposed between the ring gear 1744 and the carrier 1733 in this embodiment, it may be disposed in other suitable place.

(2) From middle speed travel to high speed travel

The forward brake 1064 is in applied state and the reverse brake 1063 is in released state, and at the same time, the path switching clutch 1009 is in engaged state. When the vehicle comes to cruise in this state, the one-way clutch 1745 is released and the engine output power is transmitted to the rear wheels through the second power transmission path 1004 including the infinitely variable gear 1008.

In this embodiment, the forward-reverse shift mechanism 1006 is formed by the brakes 1063 and 1064 which are fixed to the casing 1010 at their one ends and accordingly the hydraulic systems for actuating the brakes 1063 and 1064 can be fixed to the casing 1010, whereby the hydraulic circuit can be simplified, the number of parts can be reduced and the brakes can be precisely controlled.

What is claimed is:

1. A power transmission system for a vehicle for transmitting engine output power to driving wheels of the vehicle comprising a transmission output shaft, a first power transmission path having a forward-reverse shift mechanism and a reduction gear, a second power transmission path having an infinitely variable gear and which is connected to the output shaft independently from said first power transmission path, and a path switching means for switching the power transmission path between the first and second power transmission paths according to the running condition of the vehicle,
   wherein said first power transmission path is connected to said transmission output shaft of the power transmission system which is connected to the driving wheels and which bypasses the infinitely variable gear, with said infinitely variable gear being formed of a toroidal speed change mechanism comprising an output disk fixed to the output shaft of the power transmission system, an input disk which can be displaced in the axial direction of the output shaft and a roller which is in contact with both the input and output disks to rotate about an axis in response to rotation of the input disk and transmit rotation of the input disk to the output disk, the transmission ratio of the toroidal speed change mechanism being changed by changing the inclination of the axis about which the roller rotates.

2. A power transmission system as defined in claim 1 further comprising a torque convertor connected between the path switching means and the output shaft of the engine.

3. A power transmission system as defined in claim 2 in which said reduction gear comprises a planetary gear mechanism.

4. A power transmission system as defined in claim 3 in which said planetary gear mechanism and the toroidal speed change mechanism are arranged coaxially with the torque convertor.

5. A power transmission system as defined in claim 2 in which said torque convertor has a lockup clutch.

6. A power transmission system as defined in claim 1 in which a torque convertor is provided in said first power transmission path upstream of the reduction gear.

7. A power transmission system as defined in claim 6 in which said reduction gear comprises a planetary gear mechanism.

8. A power transmission system as defined in claim 7 in which said planetary gear mechanism and the toroidal speed change mechanism are arranged coaxially with the torque convertor and the output shaft of each of the planetary gear mechanism and the toroidal speed change mechanism doubles as the output shaft of the other.

9. A power transmission system as defined in claim 8 in which said infinitely variable gear comprises a pair of toroidal speed change mechanisms arranged side by side in the axial direction.

10. A power transmission system as defined in claim 8 in which said planetary gear mechanism and the toroidal speed change mechanism are arranged in this order from the engine side toward the driving wheels.

11. A power transmission system as defined in claim 10 in which said second power transmission path has a bypass shaft which extends in parallel to the axis of the planetary gear mechanism, one end of the bypass shaft being connected to an input element to the torque convertor by way of a first gear train and the other end of the bypass shaft being connected to the input disk of the toroidal speed change mechanism by way of a second gear train.

12. A power transmission system as defined in claim 10 in which said planetary gear mechanism and the toroidal speed change mechanism are positioned adjacent to each other.

13. A power transmission system as defined in claim 12 in which said infinitely variable gear comprises a pair of toroidal speed change mechanisms arranged side by side in the axial direction, and said second power transmission path has a bypass shaft which extends in parallel to the axis of the planetary gear mechanism, one end of the bypass shaft being connected to an input element to the torque convertor by way of a first gear train and the other end of the bypass shaft being connected to the input disk of the toroidal speed change mechanism by way of a second gear train.

14. A power transmission system as defined in claim 1, further comprising a bypass shaft having a first end thereof connected to an input element of said first power transmission path and a second end thereof connected to an input element of said infinitely variable gear.

15. A power transmission system for a vehicle for transmitting engine output power to driving wheels of the vehicle comprising a first power transmission path having a forward-reverse shift mechanism, a reduction gear and a torque converter upstream of said reduction gear, said reduction gear including a planetary gear mechanism, a second power transmission path having an infinitely variable gear, and a path switching means which switches the power transmission path between the first and second power transmission paths according to the running condition of the vehicle;

wherein said infinitely variable gear is formed of a toroidal speed change mechanism comprising an output disk fixed to an output shaft of the power transmission system, an input disk which can be displaced in the axial direction of the output shaft and a roller which is in contact with both the input and output disks to rotate about an axis in response to rotation of the input disk and transmit rotation of the input disk to the output disk, the transmission ratio of the toroidal speed change mechanism being changed by changing the inclination of the axis about which the roller rotates; and said second power transmission path has a bypass shaft which extends in parallel to the axis of the planetary gear mechanism, one end of the bypass shaft being connected to an input element to the torque convertor by way of a first gear train and the other end of the bypass shaft being connected to the input disk of the toroidal speed change mechanism by way of a second gear train.

16. A power transmission system for a vehicle for transmitting engine output power to driving wheels of the vehicle comprising a first power transmission path having a forward-reverse shift mechanism, a reduction gear and a torque converter upstream of said reduction gear, said reduction gear including a planetary gear mechanism, a second power transmission path having an infinitely variable gear, and a path switching means which switches the power transmission path between the first and second power transmission paths according to the running condition of the vehicle;

wherein said infinitely variable gear is formed of a toroidal speed change mechanisms arranged side-by-side in the axial direction and including an output disk fixed to an output shaft of the power transmission system, an input disk which can be displaced in the axial direction of the output shaft and a roller which is in contact with both the input and output disks to rotate about an axis in response to rotation of the input disk and transmit rotation of the input disk to the output disk, the transmission ratio of the toroidal speed change mechanism being changed by changing the inclination of the axis about which the roller rotates; and said second power transmission path has a bypass shaft which extends in parallel to the axis of the planetary gear mechanism, one end of the bypass shaft being connected to an input element to the torque convertor by way of a first gear train and the other end of the bypass shaft being connected to the input disk of the toroidal speed change mechanism by way of a second gear train.

* * * * *